United States Patent [19]

Carver et al.

[11] Patent Number: 4,916,538

[45] Date of Patent: Apr. 10, 1990

[54] APPARATUS AND METHODS FOR ENHANCING A VIDEO DISPLAY

[75] Inventors: Robert W. Carver, Snohomish; Montgomery F. Ross, Woodinville, both of Wash.

[73] Assignee: Carver Corporation, Lynnwood, Wash.

[21] Appl. No.: 11,829

[22] Filed: Feb. 6, 1987

[51] Int. Cl.⁴ .............................................. H04N 7/04
[52] U.S. Cl. ..................................... 358/141; 358/166; 358/162
[58] Field of Search ................... 358/166, 37, 162, 96, 358/39, 160, 133, 12

[56] References Cited

U.S. PATENT DOCUMENTS

| 2,761,151 | 8/1955 | Smith ................................. 358/133 |
| 4,030,121 | 6/1977 | Faroudja ............................ 358/166 |
| 4,660,072 | 4/1987 | Fukinuki ............................ 358/12 |

OTHER PUBLICATIONS

Faroudja et al., "Digital and Analog Enhancement Techniques", SMPTE Journal, 1/78, vol. 87, #1, pp. 24–28.

Primary Examiner—James J. Groody
Assistant Examiner—David E. Harvey
Attorney, Agent, or Firm—Hughes & Multer

[57] ABSTRACT

A video processor for generating an improved video display by synthesizing high frequency components of a received video signal in a manner that the frequencies of the synthesized high frequency components are greater than the upper frequency limit of the received video signal. A selected higher frequency band of the received signal modulates a continuous wave signal having a selected frequency so that the upper sideband frequency components of the modulated output are greater than the video signal upper frequency limit. The lower sideband components of the modulated output are removed and the upper sideband components are then added in phase with the original video signal to generate a composite signal having a greater bandwidth than the original received signal for generating the improved video display.

8 Claims, 10 Drawing Sheets

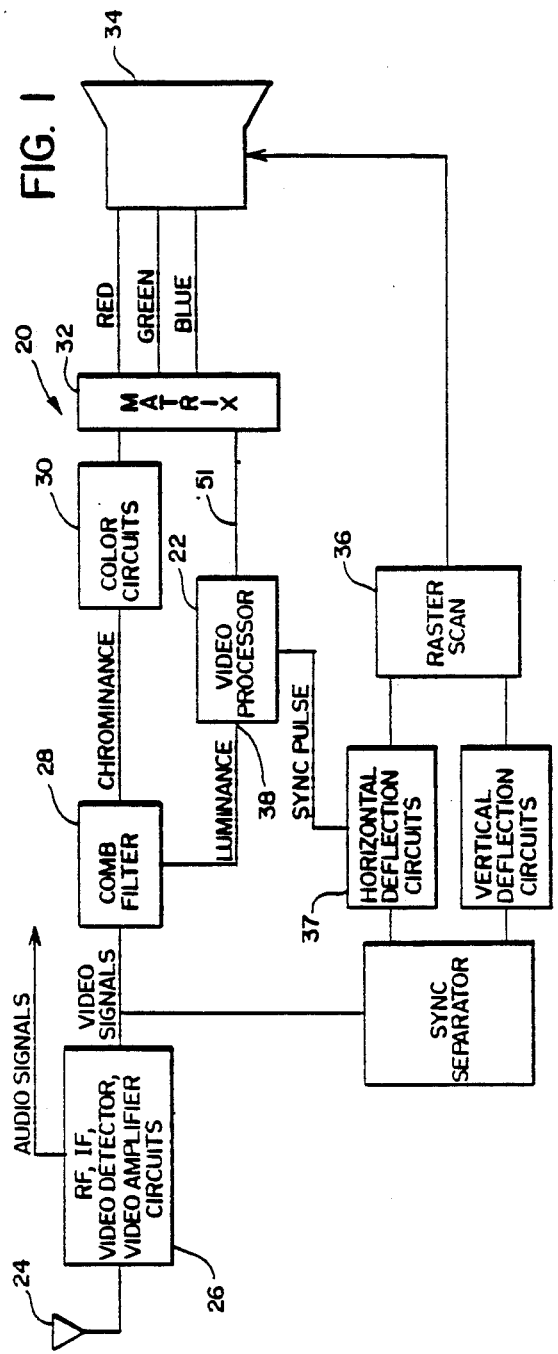
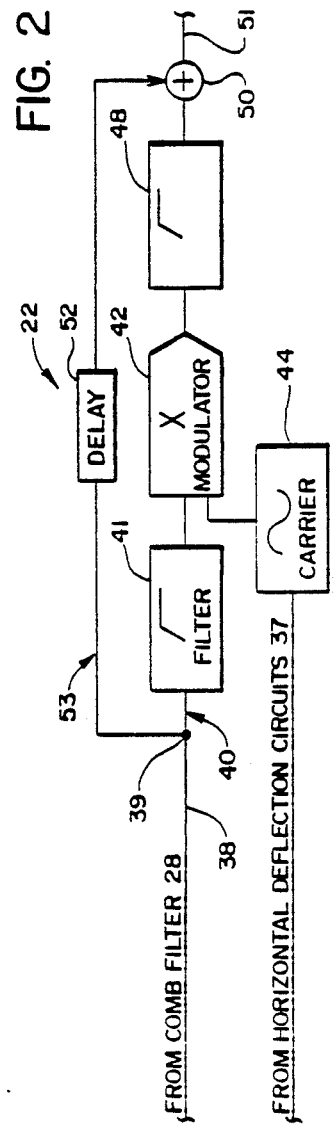
FIG. 1
FIG. 2

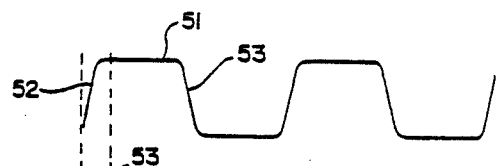
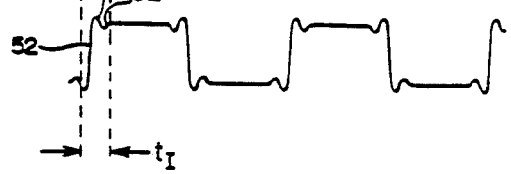

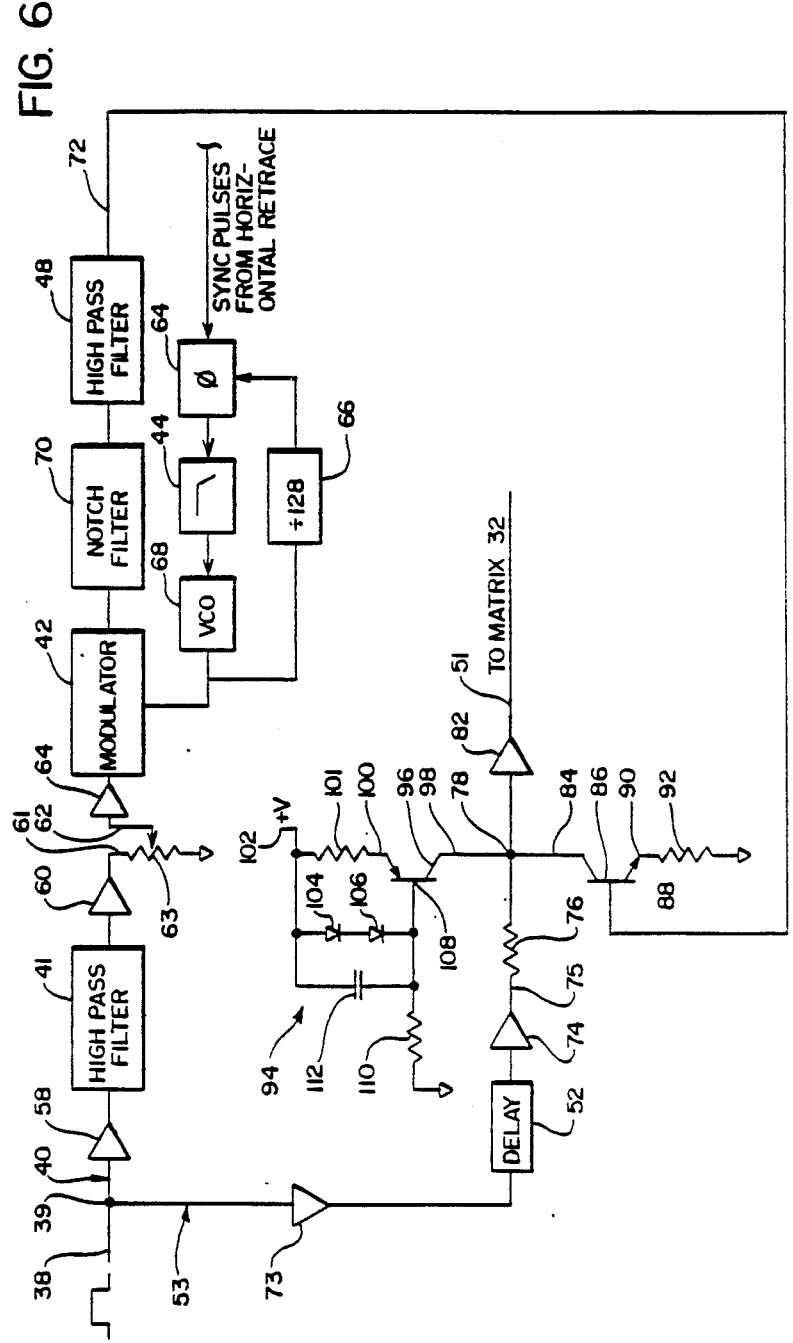

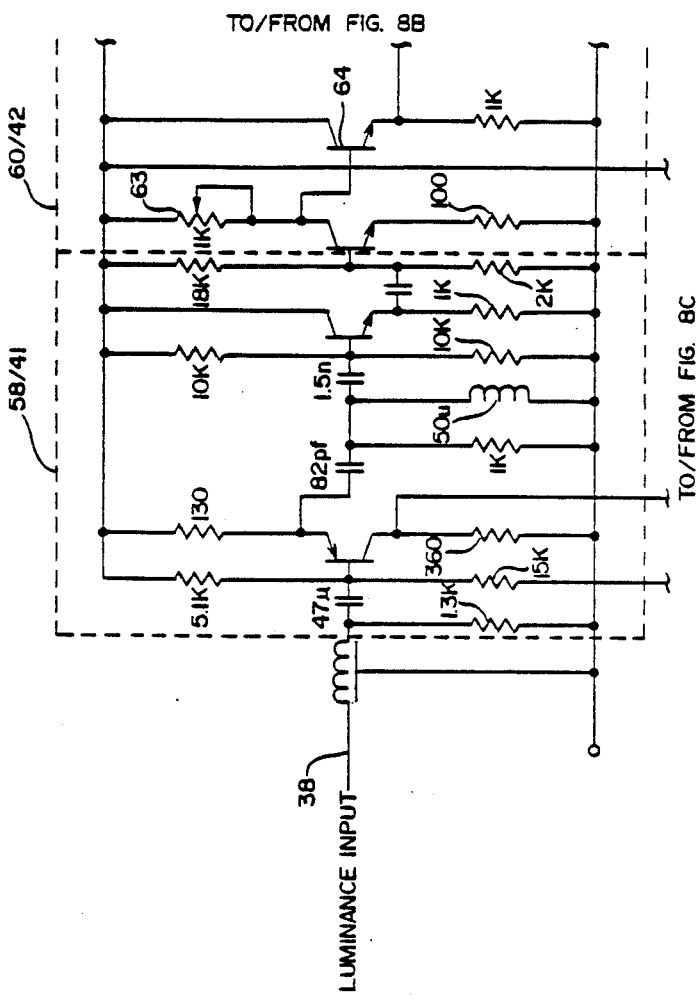

APPARATUS AND METHODS FOR ENHANCING A VIDEO DISPLAY

TECHNICAL FIELD

The present invention pertains to apparatus and methods for enhancing a video display by separating high frequency components of a received video signal and then synthesizing even higher frequency components which have frequencies that are above the upper frequency limit of the received video signal.

BACKGROUND OF THE INVENTION

Presently in the United States, the television broadcasting picture signals are limited to a bandwidth having an upper band frequency of 4.2 megahertz as set by the National Television Standards Committee (NTSC). It is commonly known that the fine details of a video picture are generated by the high frequency components of the video signal, whereas the lower frequency components generate the larger areas of the picture. However, the aforementioned conventional video bandwidth places a limitation on the resolution of the displayed images by restricting the transmission of the high frequency video components above 4.2 megahertz.

In a number of countries outside the United States, the broadcast television signals have frequency bandwidths which exceed five megahertz. The resulting images are generally considered to be superior to those broadcast in the United States because of the increased number of picture elements which are generated by the higher frequency components of the broadcast signals.

In order to increase picture resolution while staying within the video transmission frequency constraints, various enhancement techniques have been utilized. For example, a conventional technique is to generate video pulses which have transient undershoot and overshoots in the time domain. Presence of these undershoots and overshoots during a light-to-dark pulse transition or vice versa, gives the appearance of greater contrast between the light and dark picture elements and this gives the appearance of increased clarity. It is not uncommon, however, for unwanted effects such as signal "ringing" to accompany the generation of these transient overshoots. This ringing detracts from the picture quality by generating a white border at the edges of the displayed images and is often referred to as "white edge ringing".

Other methods for enhancing video images have also been disclosed. In U.S. Pat. No. 3,789,133 by Kline, there is disclosed a television camera aperture correction system in which the high frequency components are separated from the video signal. These high frequency components are amplified, the unwanted noise is removed, and the filtered high frequency signal components are added back into the video signal.

A video crispener is disclosed in U.S. Pat. No. 4,030,121 by Faroudja, in which the transition times of video signal pulses are shortened to provide sharper luminance and chroma information. This is accomplished by multiplying a function of the full wave rectified first differential of the input signal by a function of the second differential of either the input signal or another signal, and then adding the wave form resulting from their product to the properly delayed input signal.

Other video crispeners include U.S. Pat. No. 2,740,071 by Goldmark et al; U.S. Pat. No. 2,851,522 by Hollywood; U.S. Pat. No. 2,863,999 by French; and U.S. Pat. No. 2,678,964 by Loughlin.

A contour correcting circuit for decreasing the transition time of a video pulse and for eliminating preshoot and overshoot in order to enhance picture quality is disclosed in U.S. Pat. No. 4,541,014 by Yagi.

In U.S. Pat. No. 4,437,122 by Walsh et al, there is disclosed a system for enhancing the resolution of video display pixels for hard copy printouts wherein a decoder compares the pixels on the same raster line, as well as in preceding and succeeding raster lines that surround each pixel, to generate print head driving signals.

In addition, Ranalli, U.S. Pat. No. 4,382,254 discloses a multilevel video display control circuit for controlling the brightness of the pixels on a display by summing together currents developed in response to different command signals in order to reduce fringing effects.

In U.S. Pat. No. 3,946,152 by Illetschko et al, there is disclosed a correction system for video signals.

SUMMARY OF THE INVENTION

The present invention pertains to apparatus and methods for increasing the upper band frequency of an original signal which has (i) higher frequency components with a first upper frequency limit, and (ii) lower band frequency components. The higher frequency components are separated from the original signal and then multiplied by a second signal. The frequency of the second signal is selected so that the product of the separated higher frequency components and the second signal is a third synthesized signal which has frequency components which are above the upper frequency limit. In order to generate a composite video signal, the original signal having the higher frequency components and the lower frequency components is delayed for a selected time and then added to the third synthesized signal in a manner to generate a signal which is composed of the original signal and the synthesized signal; the composite signal being characterized by having frequency components above the original signal upper frequency limit. The delay time of the original signal is selected so that the original signal is added in phase with the third synthesized signal.

In an exemplary embodiment, the present invention pertains to a video processor which is incorporated in a conventional television receiver to improve the video display of the receiver. The video processor receives a conventional television transmission signal which has a limited upper band frequency, such as 4.2 megahertz in the United States, and synthesizes higher frequency components of this conventional transmission signal, to generate a signal having an upper band frequency of 6.2 megahertz. The synthesized signal is summed with the original transmission signal and the resulting composite signal is then fed to the picture generating circuit of the receiver to produce a picture having increased clarity and resolution due to the presence of the additional high frequency components.

More specifically, the video processor operates in a manner that the conventional narrower bandwidth signal which has (i) high frequency components with a first upper frequency limit, and (ii) lower frequency components, is received by the video processor where the higher frequency components are separated from the received signal. The separated higher frequency components are then multiplied with a second signal which has a frequency which is selected so that the product of the separated higher frequency components and the second signal is a third synthesized signal which has first frequency components which are greater than the upper frequency limit. The original received video signal having the higher frequency components and the lower frequency components is delayed for a selected time and then added to the third synthesized signal so as to generate a composite signal which includes the original received signal and the synthesized signal, and which has frequency components which are above the upper frequency limit. The video display is then generated in response to the aforementioned composite signal.

In the present invention, the higher frequency component is separated from the received signal by a high pass filtering operation. Furthermore, the multiplying operation is performed by modulating the second signal, which is a function of the video horizontal sweep frequency, with the separated higher frequency components to generate upper sideband frequencies which are above the first upper frequency limit, and lower sideband frequencies which are below the first upper frequency limit. The synthesized signal is filtered to remove these lower sideband frequencies prior to the operation of summing the synthesized signal with the received signal.

In another exemplary embodiment, the video display is generated by a raster scan which is driven by horizontal and vertical drive signals. The second signal is a continuous wave signal which is generated by a phase lock loop which in turn is synchronized to the horizontal drive signal of the raster scan. For use in the United States where the broadcast video signal has an upper frequency limit of about four megahertz, the selected high frequency components have a frequency of at least about two megahertz. In addition, the continuous wave signal has a frequency of about two megahertz, so that the synthesized third signal has upper band frequencies of at least about four megahertz and more particularly in the range of about four to six megahertz. Thus the composite signal has a bandwidth of from about 30 hertz to over six megahertz.

In a further exemplary embodiment, the third synthesized signal includes additional second frequency components which are a product of squaring the separated high frequency components. In order to achieve an optimum synthesized signal, the gains of the first frequency components and the second frequency components are adjusted to establish a selected gain ratio therebetween. This is accomplished by feeding a first input of the separated high frequency components to a modulator first input along a first path and feeding a second input of the high frequency components to the modulator second input via a second path which terminates at a first junction. The second signal is also input to the modulator's second input via the first junction. To adjust the gain ratio, the impedance of the second path is adjusted between (i) a high impedance state which inhibits the transmission of the second input of high frequency components to the modulator and promotes the transmission of the second signal to the modulator so as to decrease the gain ratio of the separated high frequency signals to the second signal, and (ii) a low impedance state which promotes the transmission of the second input of the high frequency components to the modulator and inhibits the transmission of the second signal to the modulator so as to increase the gain ratio of the separated high frequency components to the second signal.

It is an object of the present invention to provide apparatus and methods for increasing the upper band frequencies of a limited bandwidth signal.

It is a further object of the present invention to provide apparatus and methods for enhancing a video display by synthesizing high frequency components of a video signal which are above the upper frequency limit of the transmitted video signal.

BRIEF DESCRIPTION OF THE DRAWINGS

These and other objects and advantages of the present invention will become more readily apparent upon reading the following Detailed Description and upon reference to the attached Drawings in which:

FIG. 1 is a simplified block diagram of a television receiving circuit which incorporates the video processor of the present invention;

FIG. 2 is a simplified block diagram of the video processor of the present invention;

FIGS. 3A and 3B are simplified time domain diagrams of a conventional video pulse and the enhanced video pulse of the present invention;

FIG. 6 is a more detailed diagram of the video processor of the present invention;

FIGS. 8A through 8D are even more detailed diagrams of the second embodiment of the present invention.

Figure 5A:
FIGS. 5A through 5E are time domain diagrams of signals generated at various locations in the video processing circuit of the present invention for generating a composite signal having decreased pulse transition times.

While the present invention is susceptible to various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION OF THE INVENTION

The present invention pertains to a system for enhancing a television video display by generating high frequency components from a transmitted video signal; the high frequency components being above the upper frequency limit of the transmitted video signal. This is accomplished in the present invention by extracting the higher frequency components of the transmitted video signal, and then modulating these higher frequency components to synthesize components of even higher frequency. These synthesized higher frequency components are then summed together with the properly delayed original video signal to generate a composite video signal having upper frequency components which are above the upper frequency limit of the original video signal. The synthesized high frequency components are sufficiently related to the high frequency components of the transmitted video signal to enhance the displayed picture information. However, before proceeding with a more detailed description of the invention, a brief overview of the major components and their function will be provided.

Referring to FIG. 1, there is shown a simplified block diagram of a television receiver circuit, generally indicated at 20, in which the video processor 22 of the present invention is incorporated. A television broadcast signal, typically having an upper frequency limit in the United States of 4.2 megahertz, is received at an antenna 24, and then separated into video components and audio components and amplified at block 26. Leaving block 26, the video signals are fed to a comb filter 28 where the chrominance or color components of the signal are separated from the luminance or black and white components. While the chrominance signals are fed to conventional color circuits 30 and then to a conventional matrix 32 where red, green and blue color signals are generated and fed to a conventional cathode ray tube 34, the luminance signals are fed to the video processor 22 of the present invention.

In order to generate the high frequency video information so that it is in phase with the other elements of the video display, the video processor 22 is synced to the horizontal sweep frequency of the CRT raster scan 36 by means of sync pulses generated by the horizontal deflection circuits 37. Thus each time a horizontal re-trace is initiated by the CRT horizontal deflection circuits 37, a sync pulse is fed to the video processor 22 which causes the generated composite video signal to be in phase with the other picture information being generated by the receiver circuit 20. Having been synchronized with the horizontal re-trace, the chroma and luminance signals are then fed to matrix 32 to generate the color picture information at CRT 34.

Having described the environment of the video processor 22 in the television receiver 20, an initial overview of the video processor 22 will be provided by referring to FIG. 2. The luminance information from the comb filter 28 is fed to the input 38 of the video processor 22. From the input 38 the signal is separated at a junction 39 along a processing branch indicated at 40 where it is fed to a high pass filter 41 which passes only selected high frequency components of the original video signal. These high frequency components which are selected in accordance with criteria to be described hereinafter, are then fed to a modulator 42 where they modulate an input signal from a carrier generator 44. The carrier signal has a frequency which is selected so that the output frequency from modulator 42 is above the upper band frequency limit of the original video signal received at input 38. The input signal to modulator 42 is generated by frequency generator 44 which is synchronized to the CRT raster horizontal re-trace frequency by the sync pulse generated by the horizontal deflection circuits 37; the carrier generator generating a signal which is a selected multiple of the horizontal sweep frequency. The output from modulator 42 includes (i) an upper sideband which is the sum of the carrier generator frequency and the original video signal frequency, and (ii) a lower sideband which is the difference between the carrier generator frequency and the original video signal frequency. The modulated signal from frequency generator 44 is selected in order to generate a synthesized upper sideband frequency range which is above the conventional upper frequency limit. However, to remove the lower sideband components, the synthesized output from modulator 42 is fed through a high pass filter 48 having a roll off frequency which is above the frequency of the lower sideband components. Composite video signals are then generated at summer 50, having an output 51, by summing the signals output from filter 48, which have frequencies above the upper frequency limit, with the original video signal which is fed through a separate delay branch.

Prior to the summing operation, however, these received video signals are fed from junction 39 through a delayer 52 along a second delay branch indicated at 53. The signals are delayed by delayer 52 to compensate for the delay of the higher frequency signals through modulator 42 and filters 41, 48, and so that they are added in phase with the synthesized signals at summer 50. The resulting composite video signal from summer 50, which includes those originally transmitted signal components at or below the upper frequency limit, as well as the synthesized high frequency components above the upper frequency limit, is fed to the matrix 32 (FIG. 1) for generation of the enhanced resolution video picture.

To explain it rather simply, a conventional input video signal may be represented by the waveform shown in FIG. 3A. Each conventional pulse 51 includes a leading edge 52 and a trailing edge 53 which comprise black-to-white or white-to-black transitions. The conventional pulse in FIG. 3A has only one relatively long transition during the time interval $t_f$. On the other hand, the pulse (FIG. 3B) generated by the video processor 22 has several leading and trailing edge transitions during time interval $t_f$ resulting in a greater number of picture elements which define the edge of the image at the screen. This provides greater image resolution and improved picture quality.

It should be appreciated that in the present invention, signals having frequencies above the transmitted upper frequency limit are being generated which are related to the high frequencies of the transmitted video signal in order to enhance the picture image being broadcast. It has been found in the present invention that (i) by selecting a range of higher frequencies from the U.S. conventional 4.2 megahertz NTSC bandwidth, and then (ii) modulating this selected range of frequencies by a continuous wave signal to generate synthesized higher frequency components, that the synthesized higher frequency components are sufficiently related to the higher frequencies of the NTSC bandwidth to reproduce in greater detail the image being transmitted. In the present invention, the modulating signal is phase synced to the beginning of each horizontal sweep by the horizontal sweep sync pulse. Thus, the carrier wave is in phase with the video signal at the beginning of each left to right raster sweep.

In carrying out the present invention, the carrier generator permits the high frequency components to be shifted to a selected higher frequency range. Since signals much above 6.5 megahertz are beyond the capabilities of many conventional video circuits and picture tubes, the output of the carrier generator 44 may be selected so that a composite signal is generated in which the upwardly shifted high frequency signals remain within the capabilities of these conventional video components.

In an exemplary embodiment of the present invention, the range of modulating higher frequencies selected from the upper end of the original video signal is about two megahertz or above. Preferably this range is from about two megahertz to the upper band frequency limit of the NTCS spectrum of 4.2 megahertz. When these signals which occupy a range of 2 to 4.2 megahertz, modulate a two megahertz continuous wave signal, a synthesized video signal having a lower band frequency of approximately 4.2 megahertz and an upper band frequency of 6.2 megahertz is generated. By summing the synthesized signals back into the properly delayed original video signal having a bandwidth between about 30 hertz and about 4.2 megahertz, a composite video signal having a range from about 30 hertz to 6.2 megahertz is generated.

In the present invention, when dealing with the conventional broadcast signals having a 4.2 megahertz bandwidth, a modulating frequency lower frequency limit of about two megahertz provides the optimum picture quality. It has been found that when utilizing a modulating frequency having a lower frequency limit which is below two megahertz, to generate the synthesized higher frequency signals, the synthesized higher frequency signals are not sufficiently related to the original video signal to generate a picture of improved quality. Namely, the use of modulating signals below the lower frequency limit of two megahertz add erroneous re and post time domain information to the synthesized pulses which somewhat distorts the displayed picture images. More specifically, the use of modulation signals below two megahertz causes the addition of information which occurs for a longer time period than the actual high frequency information. When the high frequency synthesized signal is lined up with the original video signal, the added lower frequency information is present prior to and after the high frequency information of the original video signal. On the other hand, by utilizing a modulating frequency which has a lower frequency limit above two megahertz, the displayed image is improved for those portions of the picture generated by large signals, i.e. 6 to 8 dB below the maximum video signal allowable, but for those portions of the picture which are generated by small signals, i.e. 10 to 15 dB below the maximum allowable video signal, the signal is so attenuated that there is little apparent image enhancement due to the low signal-to-noise ratio.

The formation of the aforementioned higher frequency synthesized signal and the resulting composite video signal is shown more clearly by referring to FIG. 2 together with the time domain waveforms of FIG. 4. In these figures the signals operated on and generated at the video processor 22 are shown in their somewhat idealized forms for ease of explanation. In carrying out the present invention, the pulses of the original video signal (FIG. 4A) input at 38 are differentiated (FIG. 4B) by the high pass filter 41 and later used to modulate the continuous wave signal (FIG. 4C) from the frequency generator 44. The synthesized output (FIG. 4D) of the modulator 42 which contains the higher frequency components are summed with the previously delayed original video signal to form the composite signal (FIG. 4E) at summer 50. Due to the selected delay time, the higher frequency composite signals appear at the leading edge transitions and trailing edge transitions of the original video signal to generate an improved picture which is characterized by an increased number of picture elements (pixels) forming the broadcast image.

Figure 5B:
Figure 5C:
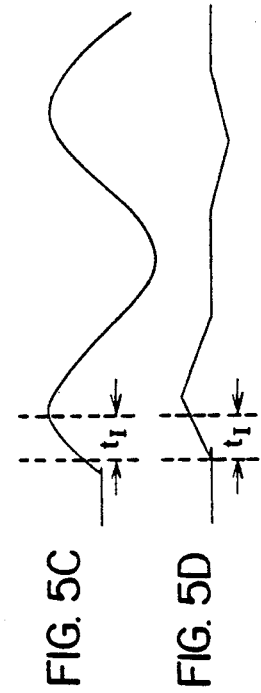
Figure 5D:
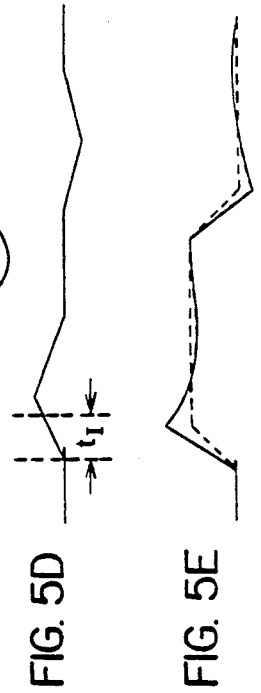
Figure 5E:
Figure 4A:
FIGS. 4A through 4E are time domain diagrams of signals generated at various locations in the video processing circuit of the present invention for generating a composite signal having higher frequency components in excess of the received signal upper frequency limit.
Figure 4B:
Figure 4C:
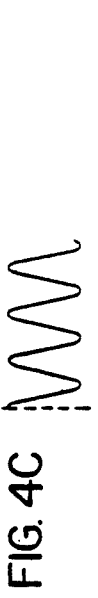
Figure 4D:
Figure 4E:
Figure 4F:
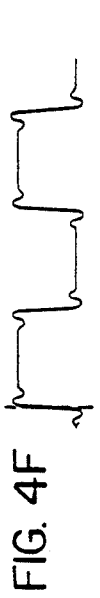

A further benefit of generating the synthesized higher frequency signals of the present invention is the sharper edge transition of the black-to-white and white-to-black pulses. Although somewhat random in nature, the summing of the high frequency synthesized signals back with the original video signal produces sharper edge transitions. This is further shown by referring to the waveforms in FIG. 5 which are shown in their idealized forms for ease of explanation. Briefly, the original video signal shown in FIG. 5A is differentiated to generate the signal shown in FIG. 5B which in turn modulates the waveform of FIG. 5C to generate the synthesized waveform of FIG. 5D. The synthesized waveform is summed with the original waveform to produce the composite waveform of FIG. 5E as discussed previously; FIG. 5E showing the composite signal generated at the summer 50 in solid lines and the original video signal in dashed lines. The synthesized signal has the steeper edge transitions designated by the numbers 55 and 56. In the present invention, steeper edge transitions of the synthesized signal result when the inputs to the modulator 42, i.e. (i) the constant continuous signal and (ii) the differentiated output from filter 41, both have rising or falling edges which occur sometime during the same time interval, which is designated by the letter $t$ in FIGS. 5C and 5D. It has been found that although the edge transitions of the signals which form the synthesized signal do not always add to produce a sharper edge transition, a significant number of edge transitions are improved so that the overall picture quality being displayed is enhanced.

Referring now to FIG. 6, there is shown a more detailed diagram of the video processor 20 of the present invention beginning with the processor input 39. Proceeding from left to right in FIG. 6, the signal at input 38 is split at junction 39 and fed to processing branch 40 and delay branch 53. At the processing branch 39, the signal is amplified by an amplifier 58 which drives the signal through the high pass filter 41. In an exemplary embodiment, the high pass filter 41 is a two pole Butterworth filter having a 3 dB rolloff at 2 megahertz in order to pass the high frequency signals in the 2 to 4.2 megahertz range.

The high frequency components which are passed by the filter 41 are fed to an adjustable amplifier 60 which is selectively adjusted to limit the amplitude of these high frequency components. If not amplitude limited, the synthesized signal when added to the original signal may generate a pattern of vertical lines created by the in phase characteristics of the carrier signal. Amplifier 60 is adjusted when viewing the picture to obtain an optimum image; the output from the amplifier being between about 30 and about 50 percent of the original video signal. To accomplish this attenuation, the output of the amplifier 60 includes a potentiometer 61 in which the wiper 62 is adjustable across a resistor 63 to ground.

Having separated and amplified the high frequency components in the 2 to 4.2 megahertz range, these components are fed to the modulator 42 which in an exemplary embodiment is a conventional double sideband suppressed carrier modulator such as the Signetics MC1496. The aforementioned separated high frequency signals modulate a continuous wave signal which is generated by the carrier generator 44, and which preferably has a constant frequency of about two megahertz. The resulting modulated output from the modulator 42 is a signal having an upper sideband range of 4 to 6.2 megahertz, and a lower sideband range which is below two megahertz, with the carrier frequency of two megahertz being suppressed.

In an exemplary embodiment, the carrier generator 44 is a phase lock loop such as the Signetics NE564 which free runs at approximately 2 megahertz. The phase detector 64 of the phase lock loop is fed by the horizontal sync pulses from a conventional television sync separator of the horizontal deflection circuits 37; the sync pulses having a frequency of 15,734 hertz. To generate the desired 2 megahertz output frequency, a divide-by-128 circuit 66 comprising two 4 bit counters in series is connected between the phase detector 64 and the voltage controlled oscillator 68 of the phase lock loop.

After the signal has been modulated, a conventional notch filter 70 having a notch frequency of two megahertz removes any remaining traces of the carrier frequency and the synthesized signal is then fed to the high pass filter 48. High pass filter 48 is a two pole Butterworth filter having a 3 dB rolloff at a frequency of 4 megahertz, thereby effectively removing the lower sideband components, while outputting the upper sideband components in the 4 to 6.2 megahertz range to an output 72.

In order to combine the synthesized high frequency signal from output 72 with the original video signal which is fed through the bypass branch 53, the bypassed signal is amplified by an amplifier 73 and then delayed at delayer 52 to offset the delay through the processing branch 40. After being delayed, the low frequency, thirty hertz to 4.2 megahertz components fed through delay branch 53 are summed with the higher frequency synthesized components generated in the processing branch 40 in the following manner. From the delayer 52 the delayed signals are amplified by a conventional amplifier 74 having an output 75 and then fed through a resistor 76 to a summing junction 78. Connected to the summing junction 78 is an output amplifier 82, the output of which is connected to the matrix 32. Also connected to the summing junction 78 is the collector 84 of a transistor 86 whose base 88 is connected to output 72 of the processing branch 40, and whose emitter 90 is connected through a resistor 92 to ground. It should be appreciated that the amplifiers 73, 82 may be inverting amplifiers in order to obtain the proper phase relationship for the black and white signal components.

In order to bias transistor 86 so that it operates in its active region, a constant current source generally indicated at 94 is connected to the summing junction 78 to generate a selected DC voltage at base 88. In an exemplary embodiment, the constant current source 94 includes a transistor 96 with a collector 98 tied to the summing junction 78, and an emitter 100 tied through a resistor 101 to a positive power supply at 102. A constant current is generated by two diodes 104, 106 which are connected in series so that the input to diode 104 is connected to the positive power supply at 102, the output of diode 104 is connected to the input of diode 106, and the output of diode 106 is connected to the base 108 of transistor 96. Since the combination of the resistor 101 and the emitter-base junction of transistor 96 are in parallel with the diodes 104, 106, the voltage drop across resistor 101 will be constant causing the collector current of transistor 96 to remain essentially constant. The base 108 is connected through a current limiting resistor 110 to ground. In addition, a despiking capacitor 112 is connected across the diodes 104, 106 to prevent any high frequency transient voltages from shutting off diodes 104, 106, in order to stabilize the constant current source.

It should be noted that the voltage at the summing junction 78 is the algebraic sum of (i) the voltage at output 75 of amplifier 74, which is a function of the original video signal, and (ii) the voltage across resistor 76 which equals the current $I_{76}$ across resistor 76 multiplied by the resistance of resistor 76. In turn, the current through resistor 76 is equal to the change in collector current of transistor 86 which in turn is the function of the synthesized signal at output 72.

Figure 7:
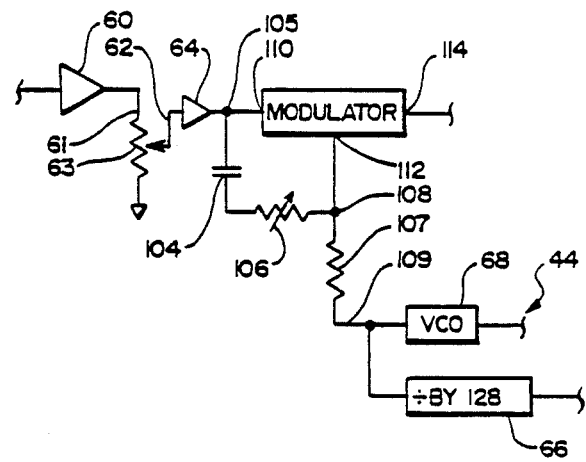
FIG. 7 is a simplified diagram of a second embodiment of the video processor which includes a signal squaring circuit.
Figure 8B:
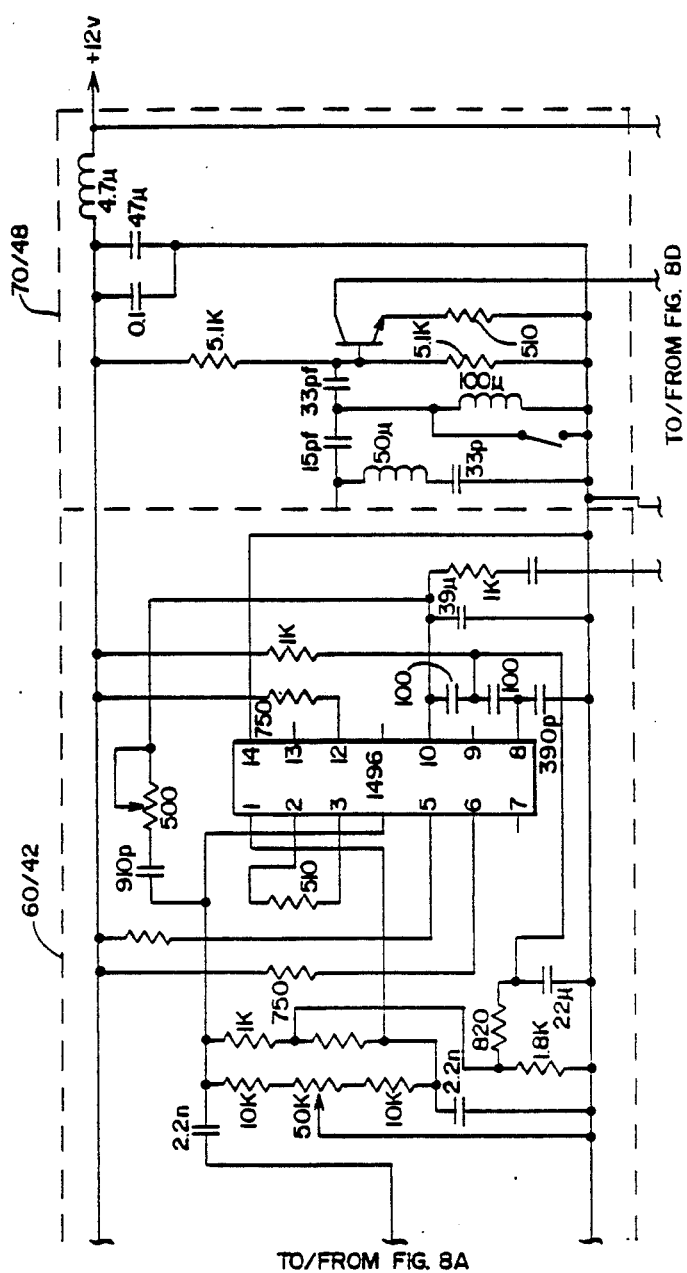
Figure 8C:
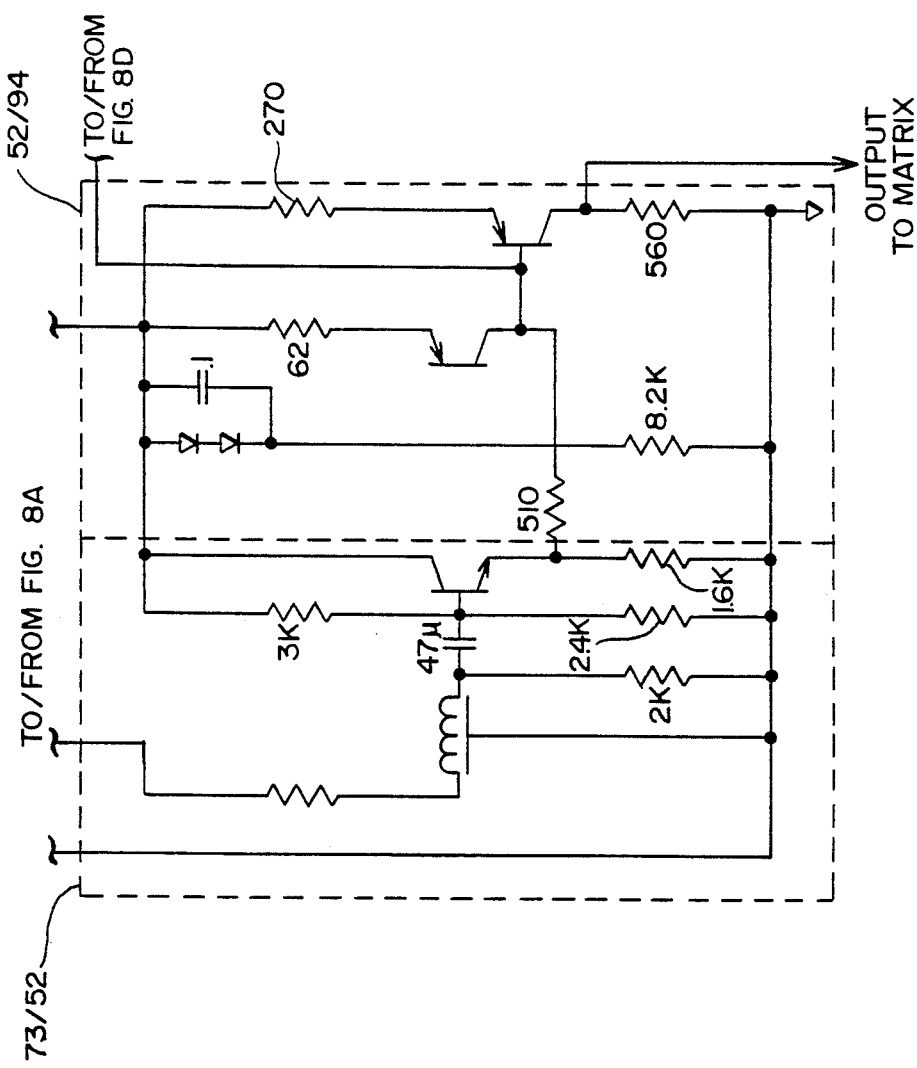
Figure 8D:
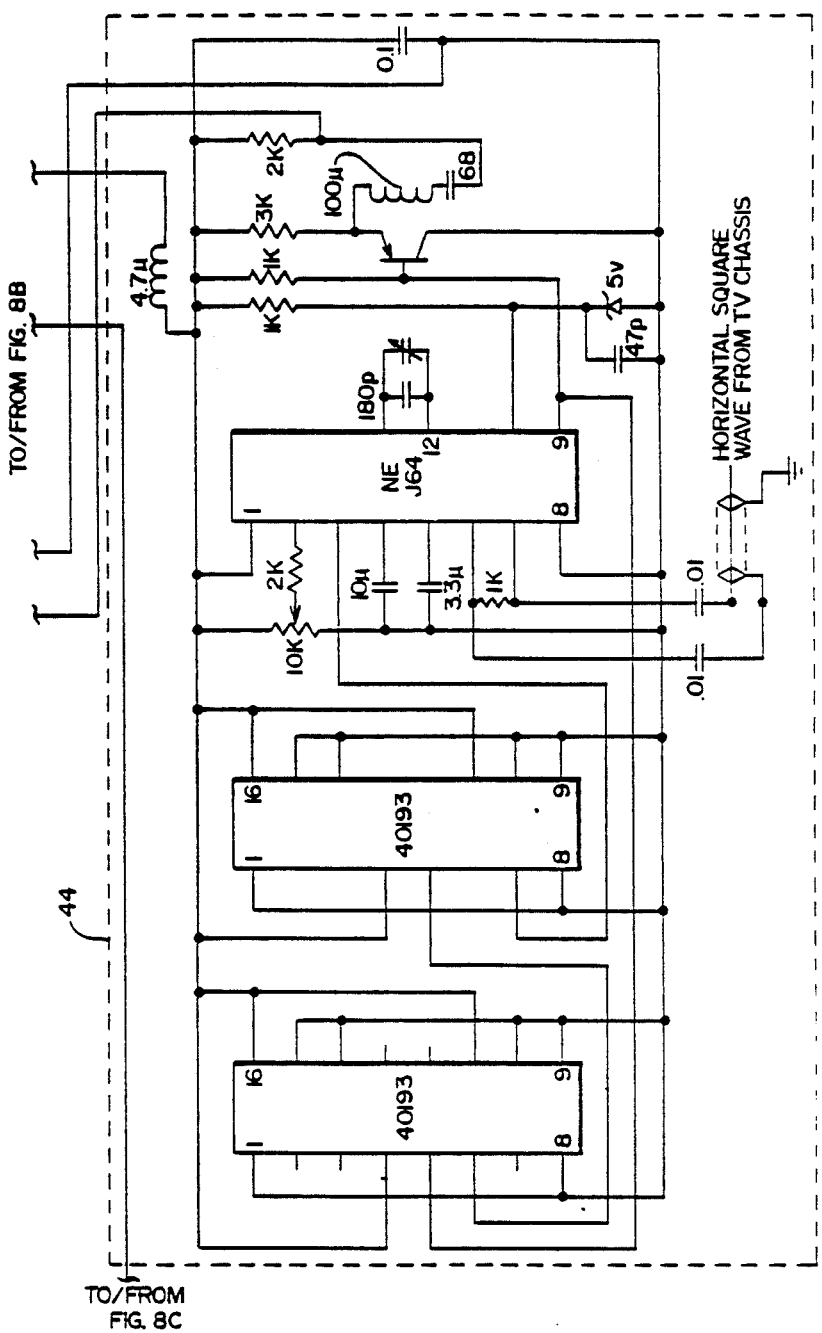

In another embodiment of the present invention there is provided a doubling circuit indicated at 100 in FIG. 7, and which is incorporated into the video processor circuit described previously with reference to FIGS. 1-6. The doubling circuit includes a capacitor 104 which is connected between the wiper 62 and the modulator 42 at a junction 105. The capacitor is followed by a potentiometer 106 which is connected between the modulator 42 and a resistor 107 at a junction 108 which in turn is connected to output 109 of the carrier generator 44. Utilizing the doubler circuit, the two to four megahertz signal which is fed to the signal input 100 of the modulator 42, is also fed to the carrier input 112 of the modulator, thereby generating a unipolar four to eight megahertz signal at the modulator output 114.

It has been found that by generating positive unipolar signals in the four to eight megahertz range, and then adding these unipolar signals back to the properly delayed original video signal at summing junction 50 (FIG. 1), the black-to-white edge transitions of the picture are improved resulting in a sharper displayed image at the screen. Furthermore, it was found that when utilizing the above described video processor without the doubling circuit 100, an enhancement of the vertical lines of the displayed image were enhanced, however the diagonal lines were degraded. It is believed this degradation was caused by the difference in phases between the video signals and the synthesized signal described previously resulting in an interference of the carrier frequency with the changing locations of the video information on the screen. However, incorporation of the doubling circuit 100 eliminates the aforementioned degradation of the diagonal lines in a manner to be described hereinafter.

In the present embodiment shown in FIG. 7, it should be appreciated that both the output of the doubling circuit 100 and the output of the carrier generator 44 are fed to the positive carrier input 112 of the modulator. The ratio of the signals from the doubling circuit 100 and the carrier generator 44 is adjusted by the potentiometer 106 More specifically, the adjusting amplifier 60 includes a transistor 64, connected in a emitter follower configuration and having a low impedance output, which drives the signal to the modulator positive signal input 110 as well as through the doubling circuit 100. When the potentiometer 106 is adjusted to be low impedance, the signal from the emitter follower 60 is driven through the low impedance potentiometer 106 to the modulator positive carrier input 112. In addition, the output from the carrier generator 44 is driven through the low impedance doubler circuit 100 so there is no carrier signal input to the modulator 42. In this position of the potentiometer 106, the output from modulator 42 is simply the frequency doubler output of a unipolar, four to eight megahertz signal.

On the other hand, when the potentiometer 106 is adjusted to be high impedance, the output from emitter follower 60 is fed to the signal input 110 of the modulator 42, with the output from the carrier generator 44 being fed to the modulator carrier input 112. In this position of potentiometer 106, the output from the modulator 42 is the four to six megahertz bipolar signal described in the previous embodiment.

In carrying out the present invention, it has been found that when the potentiometer 106 is high impedance, i.e. no frequency doubling, the vertical lines of the picture are enhanced with some degradation in the diagonal lines; whereas when the potentiometer is set at low impedance, i.e. no input from carrier generator 44, the horizontal lines of the picture are enhanced, but also with some degradation in the diagonal lines of the picture. Optimum sharpness of the horizontal, vertical and diagonal lines as well as improved black-to-white edges of the displayed image are achieved by adjusting the potentiometer 106 so that an optimum ratio of signals from both the doubling circuit and the carrier generator is fed to the modulator carrier input 112. The adjustment of potentiometer 106 is accomplished by viewing the picture to obtain an optimum image; however, typically the potentiometer is adjusted so that between about 50 percent to about 60 percent of the carrier generator signal and between about 50 percent to about 40 percent of the doubler circuit signal are fed to the modulator input 112.

It should be appreciated that the doubler circuit 100 may also be used to improve the white-to-black edges of the picture. This is accomplished by inverting the polarity of the output from the doubler circuit as shown in FIG. 10, with the junction 105 being tied to the negative signal input of the modulator 42 and the junction 108 being tied to the negative carrier input of the modulator.

Figure 9:
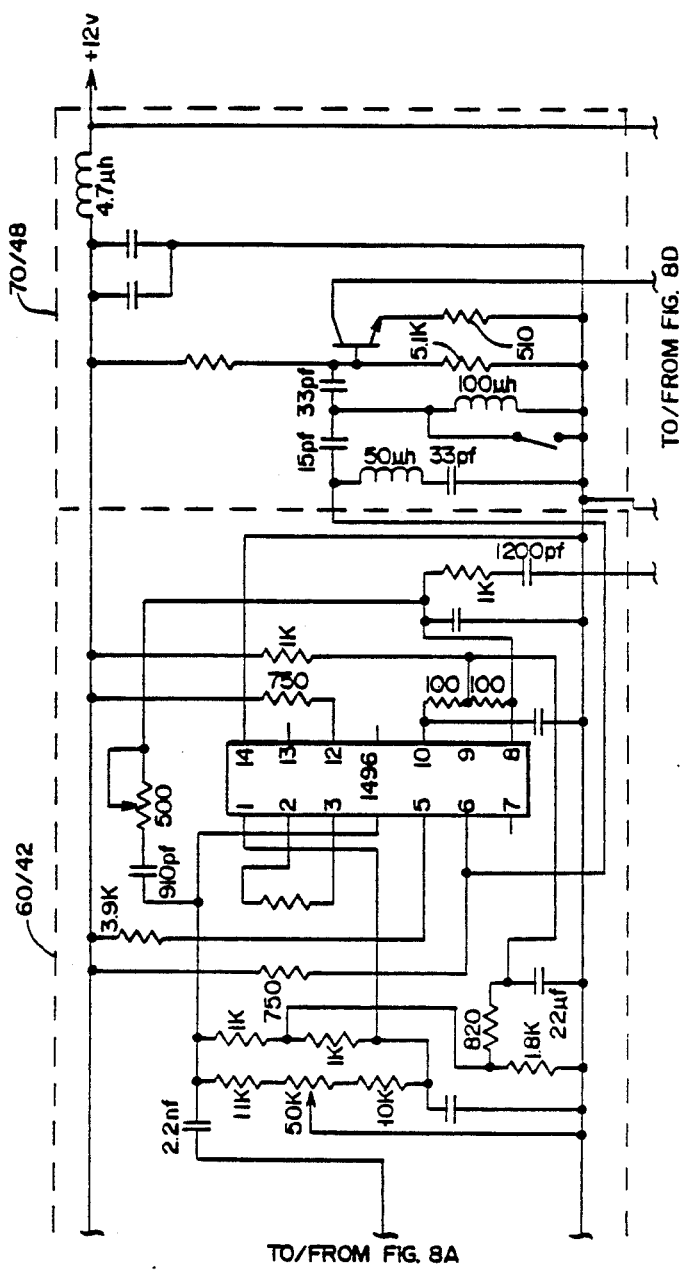
FIG. 9 is a detailed diagram of a third embodiment for enhancing white to black edges of a picture image.

Although it is believed that the aforementioned disclosure is sufficient to permit one of ordinary skill in the art to make and use the video processor 22, there is provided in FIG. 9 an even more detailed diagram of the video processor including the doubling circuit 100 for generating positive unipolar pulses; the circuit diagram of FIG. 9, including representative component values, being self explanatory and thus not described further herein.

What is claimed is:

1. A method for enhancing a video display comprising the steps of:
   a. providing a first signal for generating the video display, the first signal having
      (i) higher frequency components with a first upper frequency limit, and
      (ii) lower frequency components;
   b. receiving a first portion of the first signal and separating the higher frequency components from the first portion;
   c. multiplying the separated higher frequency components by a second signal in a manner that the product of the separated higher frequency components and the second signal is a third signal having frequencies
      (i) which are above the first upper frequency limit and
      (ii) which is equal to a sum of the frequencies of the high frequency components and the frequency of the second signal;
   d. delaying a second portion of the first signal having the higher frequency components and lower frequency components;
   e. adding the third signal to the delayed second portion of the first signal so as to generate a composite signal;
   f. selecting a delay time of the delaying step so that the second portion of the first signal is added in phase with the third signal; and
   g. generating the video display in response to the composite signal.

2. The method as set forth in claim 1 wherein:
   a. the video display has a predetermined horizontal sweep frequency; and
   b. the second signal has a frequency which is a function of the horizontal sweep frequency.

3. The method as set forth in claim 2 wherein the second signal is phase synchronized to a synchronizing pulse of the horizontal sweep frequency.

4. The method as set forth in claim 2 wherein the second signal is a continuous wave signal having a frequency such that the third signal has frequencies which are above the first upper frequency limit.

5. The method as set forth in claim 2 wherein:
   a. the higher frequency components are separated from the first signal by a high pass filtering step; and
   b. the multiplying step is performed by
      (1). multiplying the second signal with the separated high frequency components to generate a fourth signal having
         (i) upper side band frequencies which are above the first upper frequency limit, and
         (ii) lower side band frequencies which are below the first upper frequency limit, and
      (2). removing the lower side band frequencies from the fourth signal to generate the third signal.

6. The method as set forth in claim 4 wherein:
   a. the video display is generated by a raster scan having horizontal and vertical drive components; and
   b. the continuous wave signal is generated by a phase lock loop which is synchronized to the horizontal drive component of the raster scan.

7. The method as set forth in claim 2 wherein:
   a. the first signal is a broadcast video signal with a first upper frequency limit of about four megahertz;
   b. the separated higher frequency components have frequencies of at least two megahertz;
   c. the second signal has a constant frequency of about two megahertz; and
   d. the third signal has frequencies of at least four megahertz.

8. The method as set forth in claim 2 wherein the delay time is equal to the time for the separating of the higher frequency components and for the multiplying of the separated higher frequency components by the second signal.

* * * * *